Patented Dec. 19, 1950

2,534,542

UNITED STATES PATENT OFFICE 2,534,542

STAND-BY BATTERY SYSTEM

Justus H. Bower, Berkeley Heights, N. J., assignor to Bell Telephone Laboratories, Incorporated, New York, N. Y., a corporation of New York Application October 27, 1949, Serial No. 123,939

3 Claims. (Cl. 171—97)

This invention relates to emergency power supply systems, and, in particular, to the recharging of standby batteries used in such systems.

In the usual "float" arrangement of standby battery service, the battery floats across the principal power supply in parallel with the load. On failure of the principal power supply the battery assumes the load and when the principal supply is restored, the battery is recharged. This system as the disadvantage, however, that the battery will discharge partially whenever its open circuit voltage is greater than the principal power supply voltage and will thus, for example, follow line voltage fluctuations of the principal power supply. Since a power failure is generally preceded by a period of reduced line voltage, a battery whose reserve is partially depleted may have to assume the load when the failure does occur. In the case of a dry cell battery this is particularly important since such a battery has a greatly limited discharge capacity, but this adverse effect is by no means confined to that class of batteries.

It is thus an object of the present invention to retain the advantages of the "float" arrangement of standby battery service while preventing discharge of the battery except under conditions of total power failure.

It has been suggested in the past that this may be done by connecting a pair of blocking rectifiers in series with the standby battery in such manner that a relay, which serves to switch the battery into the load circuit, will so function only when there is a total power failure. That suggested technique, however, has the considerable disadvantage that the load is normally supplied through one of the aforesaid blocking rectifiers, thereby occasioning a voltage drop across it.

It is therefore also an object of the present invention to accomplish the aforestated principal object without causing any voltage drop in the supply to the load.

It is a further object of the invention to effect a substantial simplification of the circuits employed in the art for standby battery service of the type under consideration.

In accordance with an exemplary embodiment of the invention, one asymmetrically conducting device (a blocking rectifier or other unidirectional conductor, for example) is connected in circuit with a two-contact relay and with the load in such manner that the load is normally supplied by the principal power supply through one contact of the relay and is supplied by the battery when there is a total failure of the principal power supply. There is thus no rectifier in series with the battery as it is supplying the load and a drop in voltage is thereby avoided, which feature is of great importance. Furthermore, this circuit is simpler in its design than those to be found in the prior art and is thus less expensive to construct.

The invention will be more fully understood from the following detailed description of an illustrative embodiment thereof taken in conjunction with the appended drawing, the single figure of which is a schematic diagram of that illustrative embodiment.

In the arrangement shown in the drawing, the circuit load 17 is normally supplied by the principal D. C. power supply 10 through contact 15 of a relay 13 which is normally energized by the same principal power supply. A standby battery 11, in series with asymmetrically conducting device 12, is connected in parallel with the principal power supply and has the same polarity as this power supply. The asymmetrically conducting device 12, which may comprise any of the common forms of so-called unidirectional conductors well known in the electrical art, such as, for example, an ordinary selenium or copper oxide rectifier, is connected so that it permits current to flow from the principal power supply 10 through the battery 11 in a charging direction only. If the battery is of a higher voltage than the principal power supply, no current will flow in or out of the battery but the load will continue to be supplied by the principal power supply through the "make" contact 15 of the relay.

If there is a total failure of the principal power supply 10, relay coil 13 is no longer energized and the relay releases, thus permitting the battery to supply the load through back contact 16 of the relay. The relay cannot be energized by the battery because of the blocking of current flow in that direction by the asymmetrically conducting device 12. When power is restored, contact arm 14 is pulled up by the relay solenoid 13 and the principal power supply once more assumes the load. The battery accepts charge whenever its voltage is below that of the principal power supply, but if the principal supply voltage drops, due to normal line voltage variations, for example, the battery cannot discharge whatsoever. Thus, the situation will not ordinarily occur in which the battery's reserve capacity is depleted just preceding a time of power failure. During Dec. 19, 1950   J. T. BULLOCK   2,534,543
LIGHT CONCENTRATING REFLECTOR CAMERA
Original Filed Sept. 16, 1946
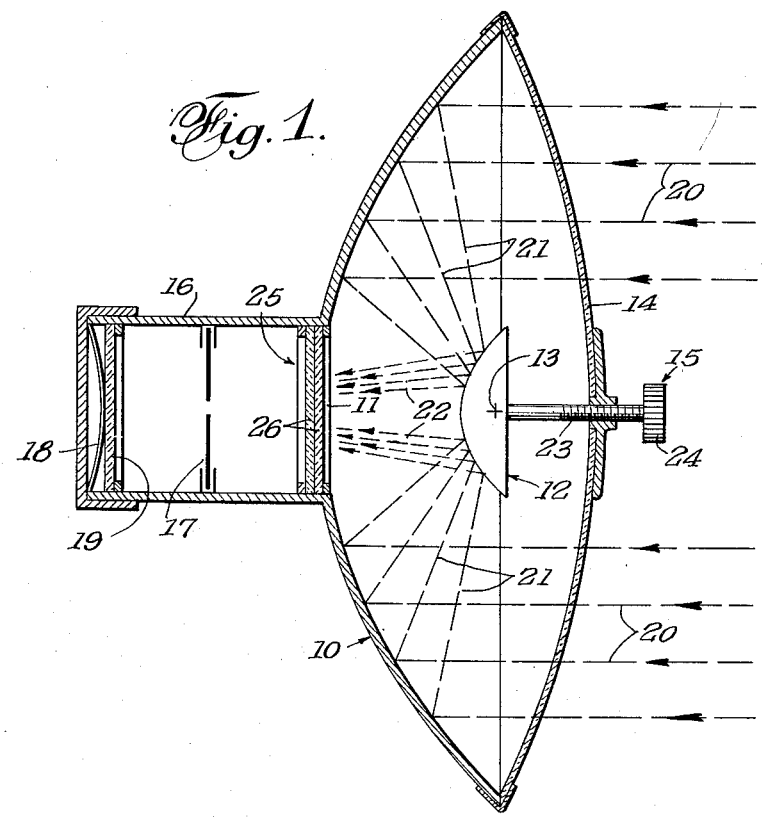
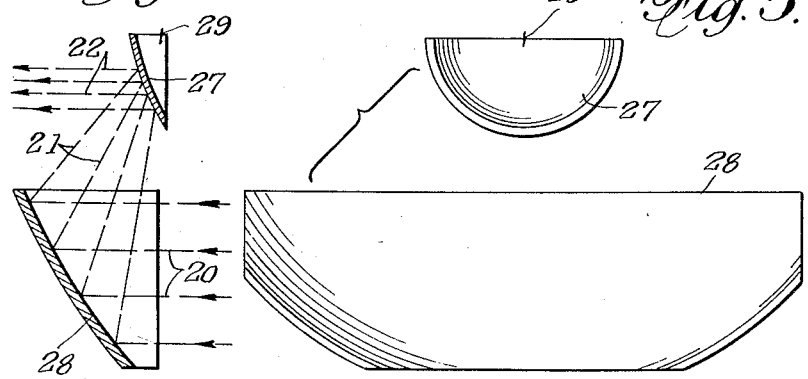
Inventor
JESSE T. BULLOCK
By
C. G. Stratton
Attorney